United States Patent
Gautron

(10) Patent No.: US 12,013,844 B2
(45) Date of Patent: *Jun. 18, 2024

(54) CONCURRENT HASH MAP UPDATES

(71) Applicant: Nvidia Corporation, Santa Clara, CA (US)

(72) Inventor: Pascal Gautron, Speracedes (FR)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/186,751

(22) Filed: Mar. 20, 2023

(65) Prior Publication Data

US 2023/0297562 A1    Sep. 21, 2023

Related U.S. Application Data

(63) Continuation of application No. 16/930,633, filed on Jul. 16, 2020, now Pat. No. 11,609,899.

(51) Int. Cl.
| | |
|---|---|
| *G06F 16/23* | (2019.01) |
| *G06F 9/46* | (2006.01) |
| *G06F 9/52* | (2006.01) |
| *G06F 16/22* | (2019.01) |
| *G06T 15/06* | (2011.01) |

(52) U.S. Cl.
CPC .......... *G06F 16/2379* (2019.01); *G06F 9/46* (2013.01); *G06F 16/2255* (2019.01); *G06T 15/06* (2013.01)

(58) Field of Classification Search
CPC .... G06F 16/2379; G06F 9/46; G06F 16/2255; G06F 9/52; G06T 15/06
See application file for complete search history.

(56) References Cited

U.S. PATENT DOCUMENTS

| | | |
|---|---|---|
| 10,303,383 B1 | 5/2019 | Karr |
| 11,087,522 B1 | 8/2021 | Surti et al. |
| 2007/0244850 A1 | 10/2007 | Hoppe et al. |
| 2012/0117075 A1 | 5/2012 | Gokulakannan |
| 2014/0321553 A1 | 10/2014 | Clark |
| 2017/0220617 A1 | 8/2017 | Bortnikov et al. |
| 2018/0012105 A1 | 1/2018 | Fan et al. |

(Continued)

OTHER PUBLICATIONS

International Search Report and Written Opinion issued in PCT Application No. PCT/US2020/042509, dated Apr. 1, 2021.

(Continued)

*Primary Examiner* — Robert W Beausoliel, Jr.
*Assistant Examiner* — Mohammad S Bhuyan
(74) *Attorney, Agent, or Firm* — Hogan Lovells US LLP

(57) ABSTRACT

Approaches in accordance with various embodiments can perform spatial hash map updates while ensuring the atomicity of the updates for arbitrary data structures. A hash map can be generated for a dataset where entries in the hash map may correspond to multiple independent values, such as pixels of an image to be rendered. Update requests for independent values may be received on multiple concurrent threads, but change requests for independent values corresponding to a hash map entry can be aggregated from a buffer and processed iteratively in a single thread for a given hash map entry. In the case of multi-resolution spatial hashing where data can be stored at various discretization levels, this operation can be repeated to propagate changes from one level to another.

20 Claims, 11 Drawing Sheets

(56) References Cited

U.S. PATENT DOCUMENTS

2018/0181329 A1   6/2018   Bhati et al.
2021/0213973 A1   7/2021   Carillo Pena et al.

OTHER PUBLICATIONS

Dietrich et al., "Massive Model Visualization using Realtime Ray Tracing", ACM SIGGRAPH 2008 Classes, Aug. 11, 2008 (Aug. 11, 2008), pp. 1-33, XP055788954, DOI: 10.1145/1401132.1401191.
Notice of Allowance issued in U.S. Appl. No. 16/930,633, dated Oct. 26, 2022.
Non-Final Office Action issued in U.S. Appl. No. 16/930,633, dated Mar. 24, 2022.

```
ALGORITHM 1: Pseudocode for concurrent hash map updates
/* One-time Initialization                                   */
foreach Entry e in HashKeys do
    e.lastChange = NO_PRECEDENT;
    e.wasTouched = false;
end
TouchedList.reset();
ChangeList.reset();
/* Change generation, typically included in the
   raytracing kernel                                         */
foreach Change request r in parallel do
    requestIndex = reserveChangeRequestSlot();
    /* Those two atomic operations can be collapsed into
       one by packing both variables into a single
       32-bit value                                          */
    r.previousChange =
      atomicExch(HashKeys[r.hashEntry].lastChange, requestIndex);
    wasTouched = atomicExch(HashKeys[r.hashEntry].wasTouched,
      true);
    if !wasTouched then
        | TouchedList.enqueue(r.hashEntry);
    end
    ChangeList[requestIndex] = r;
end
/* Commit the changes to the hash map                        */
foreach Entry index c in TouchedList in parallel do
    clIndex = HashKeys[c].lastChange;
    totalChange = emptyContribution();
    while clIndex != NO_PRECEDENT do
        totalChange = combineContributions(totalChange,
          ChangeList[clIndex]);
        clIndex = HashKeys[c].lastChange;
    end
    HashMap[c] = combineContributions(HashMap[c],
      totalChange);
    HashKeys[c].wasTouched = false;
    if propagateToCoarserLODs then
        if hasParent(c) then
            parentIndex = getParentEntryIndex(c);
            parentChangeRequest =
              createChangeRequest(parentIndex, totalChange);
            Reapply algorithm with parentChangeRequest;
        end
    end
end
```

FIG. 4

CONCURRENT HASH MAP UPDATES

CROSS-REFERENCE TO RELATED APPLICATION

This application is a continuation application and claims priority to U.S. patent application Ser. No. 16/930,633, filed Jul. 16, 2020, entitled "CONCURRENT HASH MAP UPDATES," and which issued as U.S. Pat. No. 11,609,899 on Mar. 21, 2023, the full disclosure of which is hereby incorporated herein by reference in its entirety for all purposes.

BACKGROUND

Computing tasks are becoming ever-more complex, which creates new challenges in determining how to best perform those tasks. For tasks relating to graphics and animation, for instance, there may be many different sources of light (including reflections) that may impact the appearance of potentially all pixels in an image or video frame. Performing tasks such as ray tracing for all these sources with respect to all these pixels, particularly in parallel, can require an amount of resource capacity that is impractical at best for many different applications. Simply reducing the number of rays or pixels processed can result in an appearance that is not as accurate or realistic as desired.

BRIEF DESCRIPTION OF THE DRAWINGS

Various embodiments in accordance with the present disclosure will be described with reference to the drawings, in which:

FIG. 4 illustrates an algorithm for concurrent hash map updates, according to at least one embodiment;

DETAILED DESCRIPTION

Figure 1A:
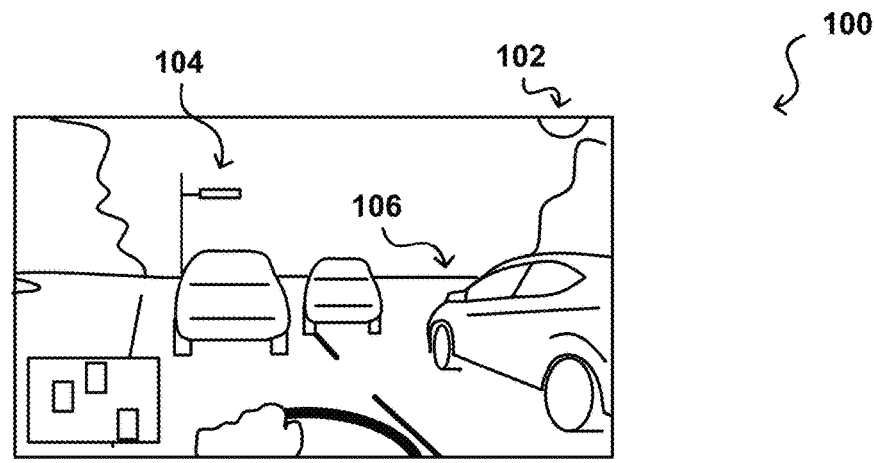
FIGS. 1A and 1B illustrate use of shading to generate an image, according to at least one embodiment.

Approaches in accordance with various embodiments can efficiently store and retrieve sparse spatial data in a massively parallel environment. An example of sparse spatial data is illustrated in FIG. 1A, where a two-dimensional image 100 is generated from a point of view of a three-dimensional world. In such an environment, the three-dimensional world can be modeled by points that are representative of the surfaces of various objects that are visible in that world. These points can represent a sparse data set, as many voxels (or volumetric pixels) in that three-dimensional world will not correspond to a surface of at least one object, and thus may contain no data representative of an object. When generating a two-dimensional image, these voxels are analyzed to determine which voxels would be visible from a point of view of a virtual camera for which that image is generated, and can use data for those voxels to determine values of pixels of the two-dimensional image.

Figure 1B:
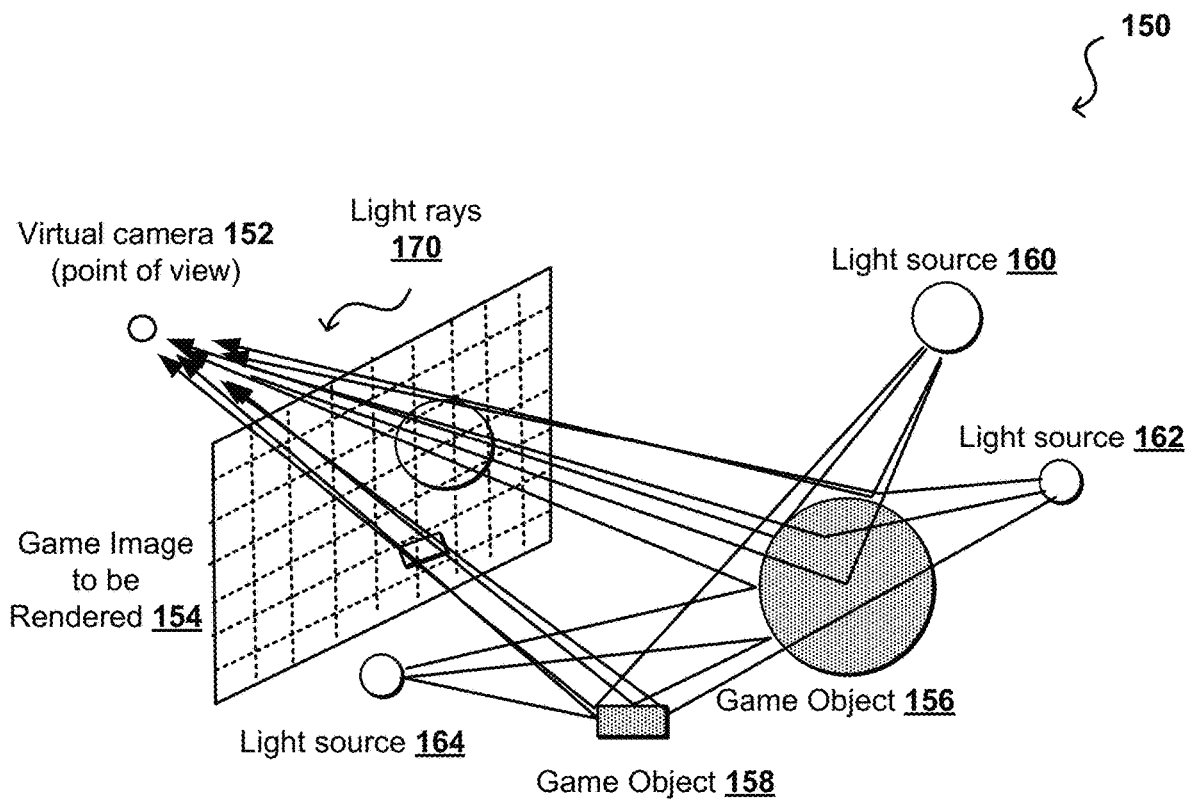

In order to increase realism of such a generated image, shading can be used to compute the light that is reflected toward the camera by these various objects. In many instances there may be multiple light sources, such as the sun 102 or moon, a street light 104, head lights and turn signals of a vehicle 106, and other such sources. Each of the objects in this environment can potentially reflect light from these sources, both towards the virtual camera as well as towards each other, which can then be reflected toward the virtual camera. Diagram 150 of FIG. 1B illustrates an approach to shading of these objects that utilizes ray tracing. Ray tracing generally involves tracing a set of light rays 170 from one or more light sources 160, 162, 164 that are reflected by one or more objects 156, 158, such as game objects for a video game, towards a virtual camera 152 corresponding to a point of view for an image 154 or video frame to be generated, such as for a frame of video game content to be rendered. In order to determine the pixel values each pixel of this image 154, a determination is made as to the rays that would pass through that pixel location for a virtual location of that frame relative to the three-dimensional world.

Figure 2:
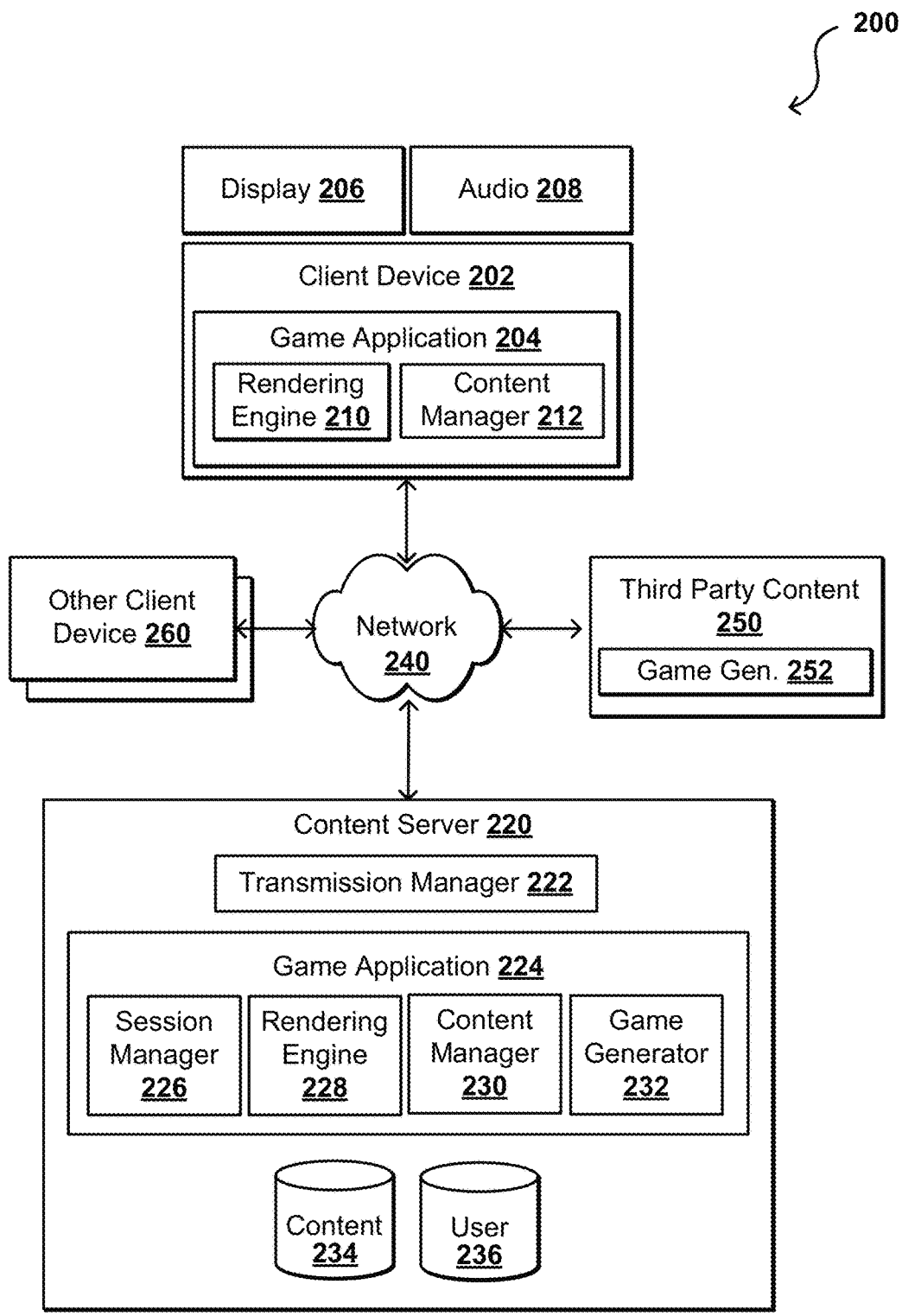
FIG. 2 illustrates a system for generating and presenting content, according to at least one embodiment.

FIG. 2 illustrates components of an example system 200 that can be utilized to generate and present such content. In this example, a client device 202 receives content over at least one network 240, but it should be understood that in some embodiments all content generation may be performed on the client device 202 or another such source. In this example, a client device 202 can receive image, video, or other media data across at least one network 240 to be presented using a least one display 206 and audio component 208. For game content, this content may be received and processed using a game application 204, or other media application, which can include a content manager for managing the content and a rendering engine 210 for rendering at least a portion of the content, at least to an extent to which the content may not already be rendered for display. In this example arrangement, client device 202 may include any appropriate computing device, as may include without limitation a desktop computer, notebook computer, set-top box, streaming device, gaming console, smartphone, tablet computer, virtual reality (VR) headset, augmented reality (AR) goggles, wearable computer, or a smart television. This client device 202 can submit a request for content across at least one wired or wireless network 240, as may include the Internet, an Ethernet, a local area network (LAN), or a cellular network, among other such options.

In at least one embodiment, content can be provided by a content server 220. The content server 220 may execute a game application 224 that can include modules such as a session manager 226, rendering engine 228, content manager 230, and game generator 232 to generate or provide content for a game or other media application. This application can utilize game content from a content repository 234, and can generate content that is appropriate for a user of client device 202 based at least in part upon user data stored in a user data repository 236, as may relate to current state data for a player in a current game session. In at least one embodiment, a transmission manager 222 can then transfer this content over the at least one network 240 to the client device, such as by streaming the content or providing the content for download. In at least one embodiment, content can come from a third party content source 250 that may also include one or more game content generation modules 252, and this content may also be sent to one or more other client devices 260, such as for an online multiplayer game. While game content is used as a primary example, it should be understood that there can be many other types of content or information that can be updated and can benefit from approaches presented herein within scope of various embodiments.

Performing a task such as updating image or video data can involve processing a large amount of data. The amount of data can increase based on a number of different factors, such as the number of light sources or objects, the number of pixels of the image to be generated, and the resolution or reflectivity of objects in that environment. Further, these light sources will not generally be point light sources reflecting off an object, but will have a shape and potential difference in illumination by position that may reflect differently from different portions of each object. As such, there can be a significant amount of data to be processed for each image or video frame, and for applications such as video games this content must be generated or refreshed at a rate of around 60 Hz or 90 Hz for at least some implementations. Such a large amount of data to be processed in such a short amount of time can require significant resources, which can be impractically expensive for various applications.

In order to attempt to reduce the resource requirements for such applications, spatial hashing can be used to efficiently store and retrieve sparse spatial data in a massively parallel environment. As used herein, a massively parallel environment can include any environment in which a large number of processors, or computing devices, can concurrently perform one or more sets of coordinated computations in parallel. A hash map can be generated that includes values for each relevant location or coordinate, as may include a direct representation of world-space data for an environment. In an embodiment where an entry in a hash map corresponds to a pixel, world-space data points visible through a pixel, there may be multiple inputs that can impact the value of that pixel, where each input may be provided by a separate thread of execution. When multiple threads need to update the content of a given hash map entry, each update is performed atomically to ensure a correct result. When simulating the behavior of light in a three-dimensional environment, for example, a significant amount of simulation would need to be performed to provide an accurate or realistic result. For applications such as electronic gaming, there may not be sufficient resources available in various implementations to perform these simulations, particularly at the frame rates required and with no dropping of frames. It therefore can be desirable to reduce the amount of computation required while keeping the simulation as close as possible to reality. One approach is to reduce the number of light rays to be simulated, but this can negatively impact accuracy of simulation. Another approach is to attempt to intelligently sample the light from a world or environment, but in many instances this still requires a significant number of samples to provide desired accuracy.

An approach such as spatial hashing can be used to amortize the computations made for one pixel to another pixel so that the next computation does not have to start from scratch. There will often be significant correlation between one pixel and the next, such as where two pixels that represent the surface of a table in an environment will typically receive similar amounts and types of lighting. Sampling a subset of these rays and using them in common across relevant pixels can help to provide desired accuracy while reducing computational requirements. In at least some embodiments, spatial hashing can involve generating a hash to represent a set of data, as may include hashing the locations of points in a scene. This hashing can involve use of any appropriate hashing algorithm, such as any of the number of secure hashing algorithms (e.g., MD5, SHA-2, or SHA-3). Each hash can provide an index in a hash map where data, such as may relate to lighting information, can be stored. A point in the same neighborhood or vicinity can then be assigned the same hash value in order to reduce computational requirements. For example, the surface of an object can be divided into cells that each contain a group of pixel locations, and each of those pixel locations can be assigned the same hash value in order to have the same lighting information applied. Spatial hashing can enable objects in an n-dimensional domain space to be projected into a one-dimensional (1D) hash table, which allows for fast querying of those objects in domain space. Such an approach can be advantageous at least in the fact that data structure is relatively simple. Further, the hash map can fill this 1D array very evenly even though the corresponding data can be quite sparse. The hash function utilized can be customized to improve performance in various embodiments. For example, a level of detail may be customizable such that cells can be made relatively small for objects that are close to a virtual camera but larger for surfaces of objects that are further away by modulating the relevant hash function.

Such an approach can be relatively straightforward when the hash map contents are simple, such as one integer per entry. When entries become more complex, however, this updating can become less straightforward. In one instance, each component of an entry can be updated independently, in which case an atomic function can be called for each component. For this instance, larger entries can have stronger atomic pressure that can result in lower performance. In another instance, components can be interdependent, and updating the entire entry may require an explicit lock on that entry. For such a situation, using locks in a massively parallel context can result in dramatic performance loss. Another possibility involves recording all required changes in a buffer, sorting this buffer so that the modifications of a given entry are grouped together, recording where each segment begins, and finally running an update with one thread per list. While efficient, such a sorting can prove expensive especially with millions of updates for every frame.

Approaches in accordance with various embodiments can perform updates to spatial hash maps, or other such constructs, in a way that avoids sorting and at least most of this atomic pressure while ensuring atomicity of updates for arbitrary data structures. In at least one embodiment, a hash map can be divided into two parts: a set of keys and the hash map entries. Individual keys can contain at least two fields: an unsigned integer checksum value C and an unsigned integer L representing the last attempt at modifying the associated entry. A hash map may also contain a Boolean value (e.g., "wasTouched") indicating whether the cell has been targeted by a change request, which can initially be set to "false" by default. In at least one embodiment, all L values can initially be set to an arbitrary, known value such as a maximum 32-bit unsigned integer value. During an information generation pass, each thread can generate a change request for the hash map. These requests can be stored in a buffer B as they are generated. Each time a request is generated, this request atomically stores the value L of the target entry, and updates L with the index of the request in the buffer B. In such an approach, each change request can have knowledge of the previously-generated change request which, in turn, enables determining all changes pertaining to a given cell.

Once B is completed, a list T of the change requests can be built for which L is equal to the index of that change request, identifying the last change requests for each considered hash map entry. This can be done in parallel on all entries in B. In some embodiments, T can be generated at the same time as B by atomically flipping the value of wasTouched, and adding the cell identifier to T if wasTouched was false. In at least one embodiment, this list T will contain the indices of the corresponding elements in B. Using the contents of T, each element of T can be processed in parallel. For each entry in T the corresponding change request in B can be fetched. Using indices L of the other change requests, an approach in accordance with at least one embodiment can proceed iteratively over all changes related to the corresponding hash entry in the same thread.

In the case of multi-resolution spatial hashing where data can be stored at various discretization levels, it is possible to repeat this operation to propagate changes from one level to one or more coarser levels. For example, ambient occlusion values can be computed at a fine discretization level, and those values can be used to improve ambient occlusion values at coarser levels of detail.

As mentioned, such an approach does not update a spatial hash map either using atomics on simple data types, or require a form of sorting, as in conventional systems. An approach in accordance with various embodiments presented herein can be general in nature, so that it is not tied to a particular type or structure of data, and can ensure atomicity since all changes for a given hash entry are processed in a single thread. Such particularly can allow for more complex data structures, as well as inclusion of types for which atomic operations may not be available, as may relate to single 16-bit floating-point values in certain implementations. Hash map updates usually involve many hash entries, hence guaranteeing high processor (e.g., GPU) occupancy even with one thread per hash entry during the update. Such an approach can be used with spatial hashing for efficient storage of data in world-space, which can be beneficial to products such as RTXGI and Omniverse to improve fidelity of global illumination computations.

In at least one embodiment, such an approach can be used in the context of massively parallel light transport simulation, such as discussed with respect to FIG. 1B, and applied to real-time computation of ambient occlusion and environment lighting on one or more graphics processing units (GPUs). For each pixel of an image, information can be generated for a point visible through that pixel. This generated information can include at least a world-space position or coordinate, as well as a normal of the visible points. This information can be used as input to compute hash entries corresponding to each visible point at several levels of detail (LoDs). In at least one embodiment, an incoming radiance value can be generated for each pixel. In some implementations, this value can be limited to an ambient occlusion value, and can be added directly to the hash map through atomic additions. A pass for ambient occlusion estimation can fetch the ambient occlusion data from the hash map, and the filtering step removes unwanted blocking artifacts due to the spatial discretization.

In at least one embodiment, this approach could be extended to store more complex data in the hash map. This could result in higher atomic pressure, and may involve limitations regarding the data types (e.g., only 32-bit values) and structure, such as where all members of a hash map must be able to be updated separately. In some implementations it may not be possible or permissible to atomically store and update 16-bit floating-point RGB values on certain processors.

In at least one embodiment, all change requests related to a given hash map entry can be aggregated, and each change entry processed sequentially to avoid concurrent accesses. One such hash map update scheme can be divided into at least two parts, as well as an optional part that may be utilized for level of detail (LoD) propagation. One part can involve computation of lighting information and generation of a set of linked lists of change requests, one per modified hash map entry. Another step can involve processing the linked lists and committing the changes into the hash map. This optional step can involve potentially propagating changes to coarser levels of detail (LOD) in the hash map. In at least one spatial hashing scheme each entry stores a checksum value to identify colliding, unrelated points to map to a same entry. The generation of linked lists may require additional data to generate the links.

In at least one embodiment, a hash map can be used as a mechanism for each change request to link to the other change requests that have been issued previously. This can involve consideration of all change requests that are stored in a buffer, such as in an unspecified order. In addition to the checksum, an additional value lastChange can be stored for each entry. This value can be a 32-bit unsigned integer, for example, that represents the index of the last change request issued for that entry. A Boolean value wasTouched can also be stored that indicates whether the entry has been referenced in the current change list. In at least one embodiment, these values can be packed together into a single value, such as a 32-bit unsigned integer, with a number of bits (e.g., 31 bits) used to represent the lastChange and at least one bit for wasTouched.

In at least one embodiment, this hash map can be separated into at least two parts. A first part can be a HashKeys buffer that contains the checksum and last change index. A HashData buffer can be used to store the actual lighting information. Modifications in the hash map can be performed through a buffer containing change requests, called ChangeList. Each entry in this ChangeList buffer can contain the index of the previously-issued change request, as well as the requested change of lighting information. The indices of unique hash entries referenced in ChangeList can be stored in a buffer called TouchedList.

When a hash entry is allocated for the first time, its value lastChange can be set to an arbitrary, reserved value. In at least one embodiment, this reserved value NO_PRECEDENT can be, for example, a 32-bit hexadecimal value 0xFFFFFFFF. The wasTouched value of the entry can be set to false.

In at least one embodiment, each pixel of an image can be processed in an independent thread. For each pixel, an ad-hoc algorithm can be used to estimate lighting information such as an incoming radiance value, such as by utilizing Monte-Carlo integration. A slot such as changeSlot can be reserved in the ChangeList and a change request generated that contains this information. In at least one embodiment the value lastChange of the hash map entry corresponding to the shaded pixel can be atomically fetched and the value exchanged. The previous value of lastChange can be stored in the change request, and the index of changeSlot can be written into lastChange. When multiple threads issue change requests for a given hash map entry, each request can then contain the index of the previously issued change in changeList. Such an approach can help to ensure a link between all changes to a given hash map entry. Upon generating a change request the wasTouched value of the corresponding hash entry can also be atomically set to true. If its previous value was false, then the index of the hash entry can be added into TouchedList.

In at least one embodiment, all entries of TouchedList can be processed in parallel. In each thread, the lastChange index of the entry can be used to fetch the last change request for that hash map entry. Since each change request contains the index of its predecessor, the previous change list item can be accessed for that entry. Those changes can then be combined according to the light transport algorithm, as may include algorithms such as simple addition or weighted average. This process can be repeated until the list is finished. In at least one embodiment, a finishing condition can be reached when the lastChange value of a change request is equal to NO PRECEDENT, meaning that first change request for that hash map entry has been reached.

In one example spatial hashing technique, contributions obtained at an LoD n are propagated to three coarser LoDs by performing atomic operations at each level. However, if an entry at LoD n receives N change requests, the hash entry for the same location at LoD n+1 will receive up to 8N change requests, LOD n+2 up to 64N changes and so on. This can create a very high atomic pressure, which may lead to poor performance. Instead, an approach in accordance with various embodiments can be leveraged to reduce the number of updates in coarser LoDs. After committing a change list into a hash cell, a new change request can be created for the cell at LoD n+1 in a second change list called ChangelistPropagate. The same process as above can then be reapplied by finding the tails of the linked lists in ChangeListPropagate, committing those lists and repeating for each coarser level. A number of change requests at each level can then be essentially constant. For efficiency, each repetition can alternate between ChangeList and ChangeListPropagate to reuse memory.

In at least one embodiment, such functionality can be implemented using graphics hardware, such as GPU-based hardware using GLSL shaders and the Vulkan API. Such application demonstrates the use of the update scheme for ambient occlusion and environment lighting. In the case of ambient occlusion case, the hash map data can be made up of two 16-bit counters: one for the total number of rays traced, the other one for the number of unoccluded rays. In an environment lighting case, the hash map can contain one RGB value, where each component is stored as a 16-bit floating-point value, and a 16-bit integer counter representing the total number of rays traced. Such a use case demonstrates an important aspect of various approaches, as the GLSL language does not allow 16-bit floating-point atomic operations so that such an implementation would not otherwise be possible without, for example, implementing an expensive approach based on mutexes.

Figure 3:
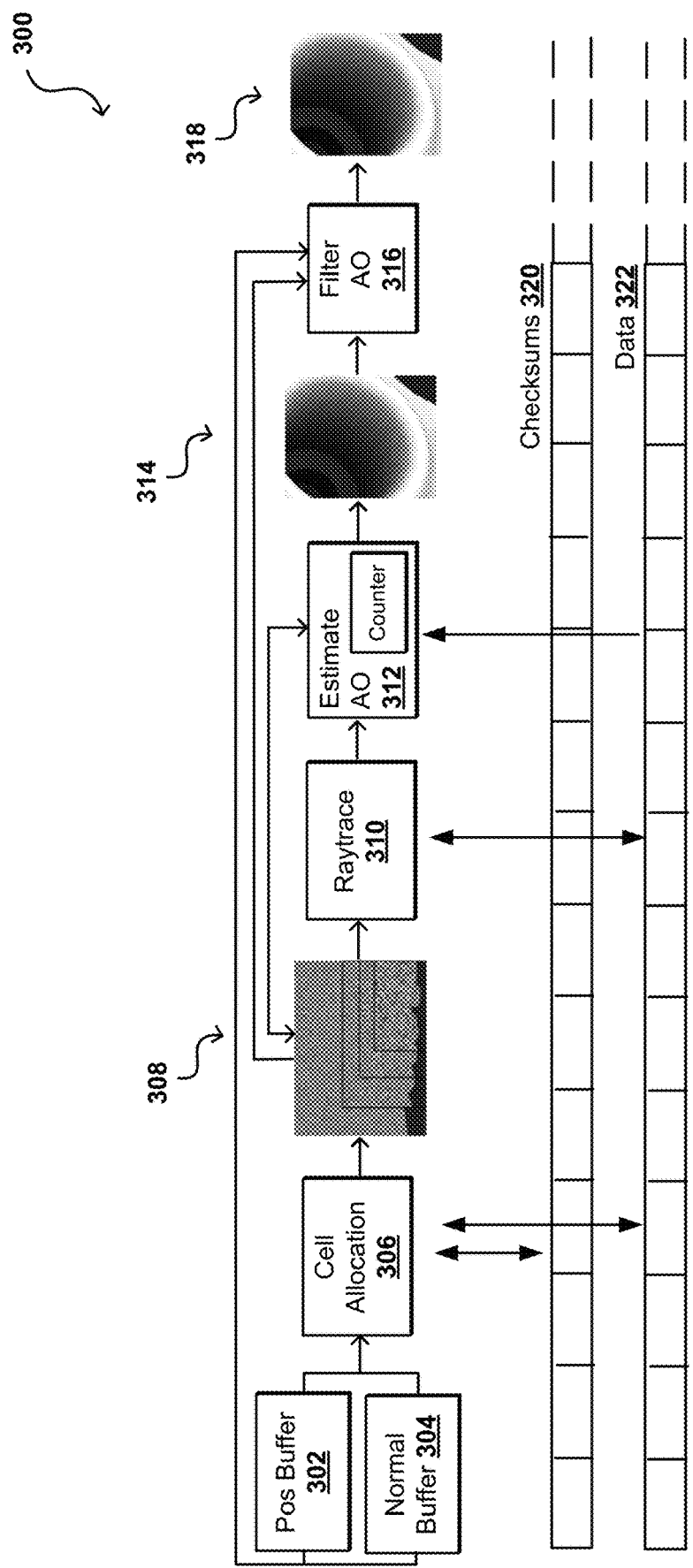
FIG. 3 illustrates components of an image processing pipeline, according to at least one embodiment.

FIG. 3 illustrates an example processing pipeline 300 that can be utilized in accordance with various embodiments. This pipeline can be used with hashed raytraced ambient occlusion, for example, where a raytracing module 310 can directly update data 322 in a spatial hash map through atomic operations. In this example, the hash values include both checksums 320 and corresponding data 322. Data received for individual requests can be stored to one or more buffers, as may include a position buffer 302 and a normal buffer 304 as discussed herein. This can be utilized with a shader wherein a determination is made as to points of a three-dimensional environment that are visible from a point of view, then storing their position as well as the normal and surface data, which are inputs to this algorithm. Such an algorithm may not care how the data was generated, such as by ray tracing or sampling, but may want to obtain information about positions and normal of that data.

In at least one embodiment, a cell allocation module 306 can assign groups of pixels to individual cells, where the sizes of those cells can vary as discussed herein, such as to have smaller cell sizes for objects that are closer to a virtual camera. As illustrated in the figure, there can be different cell sizes 308 that include different groupings of pixels of an image, such as where images of different resolutions are to be generated. There can then be several pixels that may provide updates to a given cell for any frame to be rendered. This updating is not necessarily straightforward however, as a processor such as a GPU can process everything in parallel threads, and conventional approaches could attempt to generate a parallel thread for each individual pixel to be processed in parallel, which can make it at least difficult to aggregate or combine pixel values during processing. An approach in accordance with various embodiments can block a section of memory for purposes of writing change data for these pixels. In this example, once the cells are allocated and pixels assigned to specific cells then the raytracing module 310 can perform raytracing, such as by performing ray sampling for individual cells which can then be applied to pixels contained within those cells. After raytracing, an estimation module 312 can estimate the raytraced ambient occlusion 314. Ambient occlusion is a shading technique that can be used to calculate how exposed each point in a scene is to lighting from one or more sources. In at least one embodiment, ambient occlusion can be calculated for each surface point, but also can be calculated for a given cell and then applied across the points or pixels of that cell. A filtering module 316 can then filter the ambient occlusion to produce the final output 318. As mentioned, the filtering step can remove unwanted blocking artifacts due to factors such as spatial discretization. Such an approach can enable individual hash cells to be updated using a single thread, even if there are multiple threads for multiple pixels to update a given cell. Instead of having multiple pixels communicate for one cell, the computation can instead involve one cell analyzing the contributions from all its related pixels.

In at least one embodiment, this can involve build lists, or other groupings, of all modifications that have happened, or that are to be applied, to a given cell. This can be performed on-the-fly and without any sorting. Once all changes have been generated for the cells, a pass can be utilized to go over all the cells that have been modified and iterate through this list of changes. These changes can be aggregated in a non-parallel fashion such that multiple data structures can be supported without corruption of those data structures.

In at least one embodiment, a rendering process can utilize a central hash map that can be accessed by multiple modules or components, which can be allowed to modify that hash map. As mentioned, a hash map can include data for many different cells, with one index value per cell being stored in the hash map. That index value can represent the index of the last change that was requested for that cell. During the rendering process, there can be change requests generated for any of these pixels, and this change request data can be stored to a local buffer. A determination can be made as to what was modified previously, and that index can be replaced by the index in the current change list. A next step can then directly go through the list of all cells that have been modified, and the index can point to the very last value change that was made in the hash map. That data for that change can then be aggregated with other relevant change data. A result of this process is a link list that is generated on-the-fly, with only the atomic operations reserving a space in the change list and indexes being changed as appropriate. Thus, no matter the data structure the end result is integer math with atomics.

FIG. 4 illustrates an example algorithm 400 that can be utilized in accordance with at least one embodiment. This example shows pseudocode for a number of steps in a hash map update process. A first step performs on-time initialization. After this initialization, requests are generated for specific changes, as may relate to raytracing for graphics applications. These changes are then committed to the hash map in a next step, including propagating to different levels of detail if necessary. In this example, the hash map includes a flag called "wasTouched," which is set to false by default. When a change request is generated, this flag can be flipped to "true" and the cell added into the touched list. Entries in this touched list are used to begin aggregating results. The system can launch as many threads as there are items in this touched list, and then start by fetching the last change as discussed herein. The hashing function utilized can be independent of other choices for spatial hashing.

As mentioned, such an approach can also help to manage different levels of detail. Image data may be generated for different levels of detail (LoD), as may be appropriate for different display screens or devices, as well as distance from the viewpoint. When ray tracing is performed for a pixel, the data can be added to the cell to which that pixel corresponds. In at least one embodiment, the process can start with the finest level of detail, then propagate this information across the levels of detail. In such an approach, there can be one atomic operation to update for the finest operation, which could translate to a number of atomic operations for the level above, a higher number of operations for the level above that, and so on, which could result in many atomic calls that could significantly impact performance. Approaches in accordance with various embodiments, however, can aggregate all changes to a cell at a current level, then propagate these changes to the relevant parent cells as a single change request for the parent. When the parent cell is processed, that can create one change request for the cell above, and so on. Thus, instead of an exponential number of modifications in a top level, the result is linear which drastically improves performance.

Such functionality can be implemented using any appropriate types of processors, as may include CPUs, GPUs, or combinations thereof. On a GPU-based implementation, this data can primarily be stored in GPU memory. The process of allocating cells and updating the hash map can all be performed within GPU memory, until such time as output is generated for display. This functionality can thus be performed on a client device or a gaming server, as discussed with respect to FIG. 2, among other such options. In at least some embodiments, data entered into a hash map can be retained, at least for a period of time, such that if a point comes back into view then the relevant information for that point can be fetched from the hash map.

Figure 5:
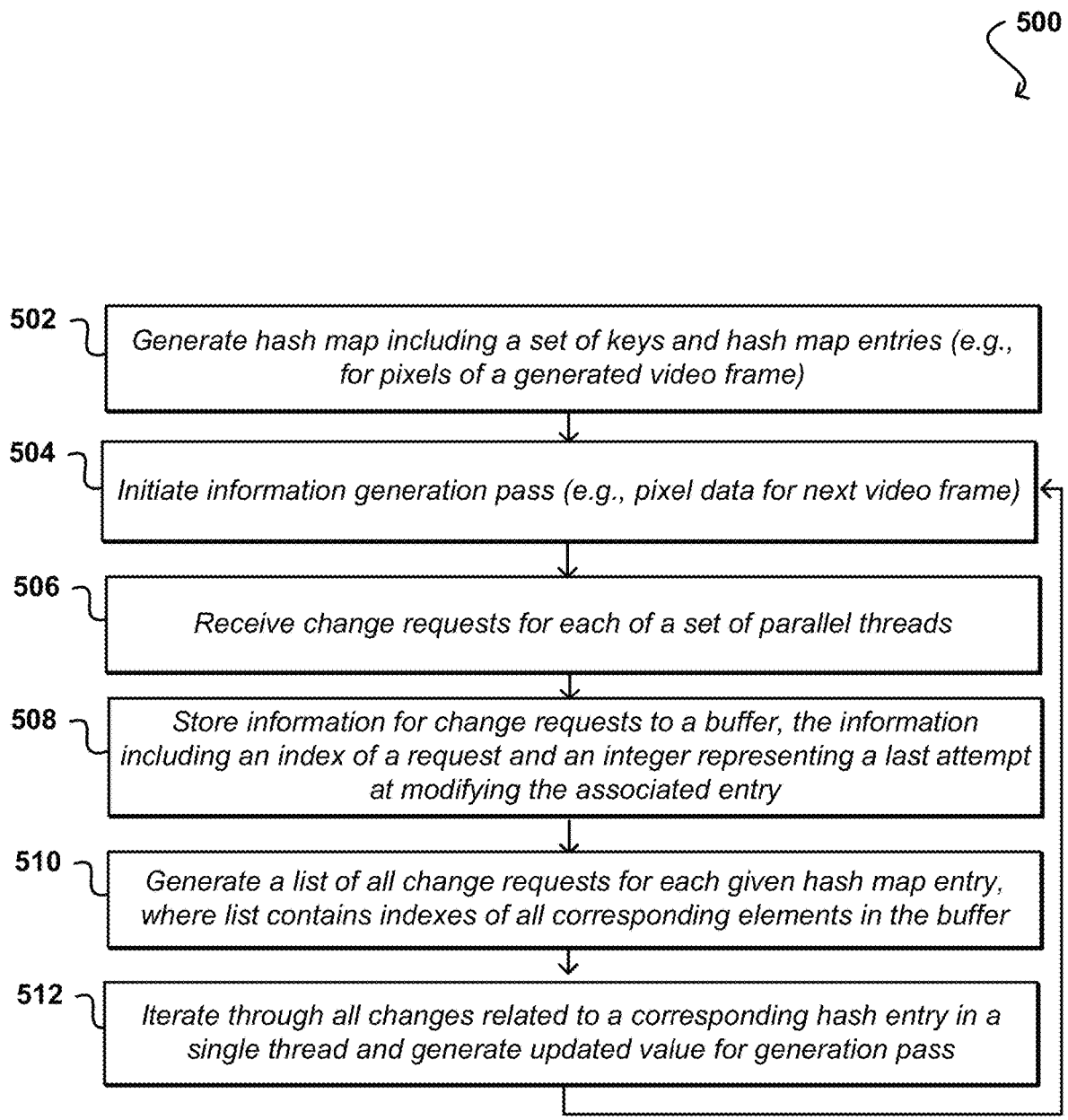
FIG. 5 illustrates a process for updating a hash map, according to at least one embodiment.

FIG. 5 illustrates an example process 500 for updating a hash map that can be performed in accordance with various embodiments. It should be understood that for this and other processes presented herein that there can be additional, fewer, or alternative steps performed in similar or alternative order, or at least partially in parallel, within the scope of various embodiments unless otherwise specifically stated. In this example, a hash map is generated 502 that includes a set of keys and hash map entries. This may correspond to pixels of an image or video frame to be rendered for display. The hash map entries can include information about pixel shading for relevant cells, as may include position and normal data. An initiation generation pass can be initiated, such as by a game or animation application that need to generate a next frame of image or video data to be rendered for display. This may include updating data for a plurality of pixels, as well as images at different resolutions. As part of this information generation pass, change requests can be received 506 for each of a set of parallel threads, as may correspond to individual pixels of the image to be generated. This change request information can be stored 508 to a buffer, where that information can include an index of a request as well as an integer representing a last attempt at modifying the associated entry in the hash map. A list of all change requests can be generated 510 for a given hash map entry, where that list contains indexes of all corresponding elements in the buffer. This process can iterate 512 through these changes for a hash entry in a single thread, and can generate an updated value for this current information generation pass. In this way, each hash entry is processed using a single thread, where all relevant changes are aggregated and processed atomically, regardless of a number of pixels contained in a cell associated with that hash entry.

Figure 6:
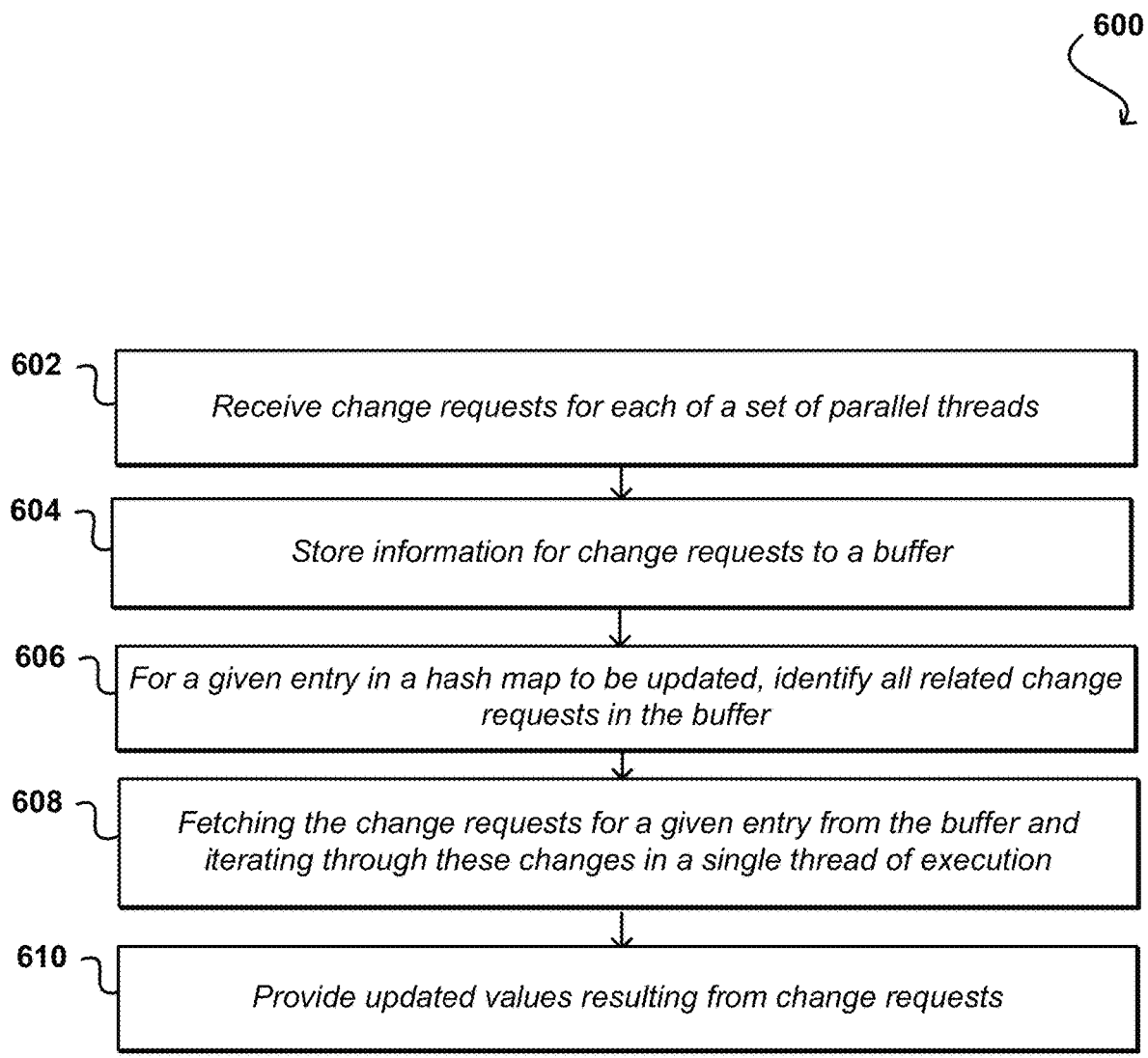
FIG. 6 illustrates a process for performing concurrent updates, according to at least one embodiment.

FIG. 6 illustrates another example process 600 that can be used to process multiple concurrent change requests in accordance with at least one embodiment. In this example, multiple change requests are received 602 over a set of parallel threads. These change requests can correspond to pixel locations of an image, for example, where data for those locations may be represented by entries in a hash map. Information for these change requests can be stored 604 to a buffer or other local repository or queue. For a given entry in a hash map to be updated, all related change requests that are currently in the buffer can be identified 606. These change requests can be fetched 608 from the buffer for a given entry, as may correspond to a cell comprised of a set of pixels. This process can then iterate through the changes for that cell in a single thread of execution. Once processed, updated values can be provided 610 that result from the set of change requests. As mentioned, this may correspond to a next frame of animation or video, among other such options discussed or suggested herein.

DATA CENTER

Figure 7:
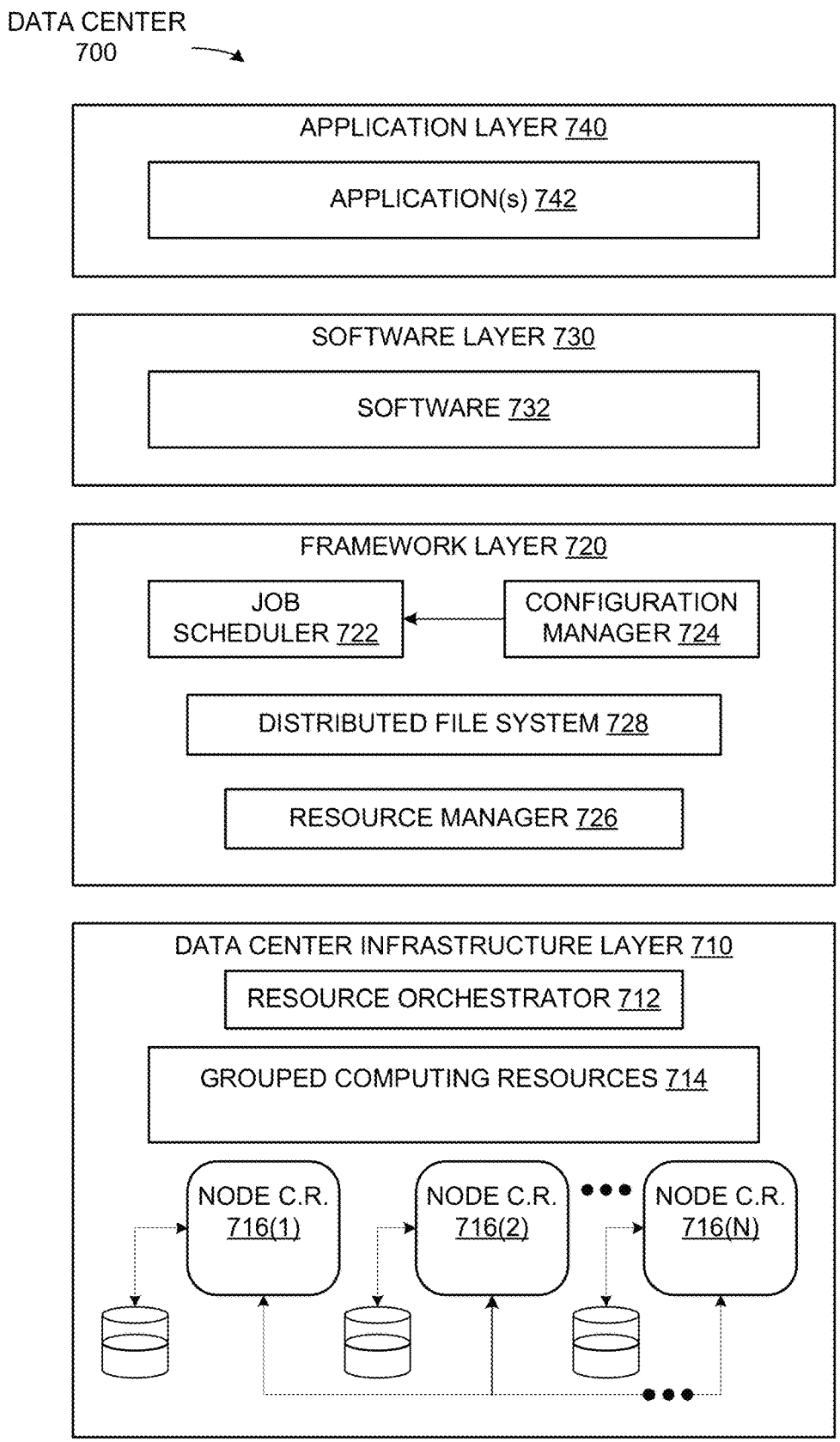
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used to update a hash map or other such construct. This can include aggregating updates from single threads into a single thread of execution for individual entries of the hash map.

COMPUTER SYSTEMS

Figure 8:
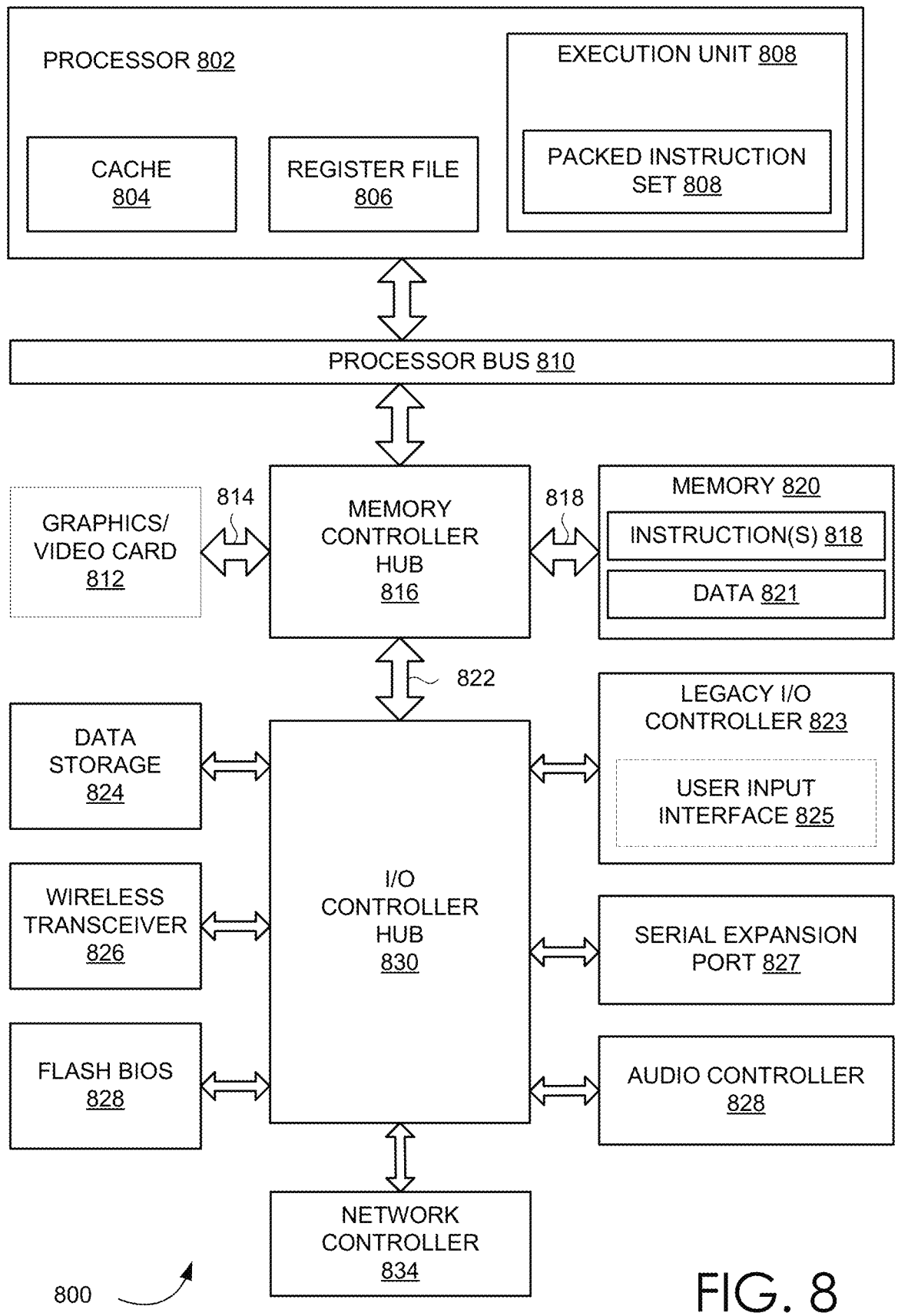
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used to update a hash map or other such construct. This can include aggregating updates from single threads into a single thread of execution for individual entries of the hash map.

Figure 9:
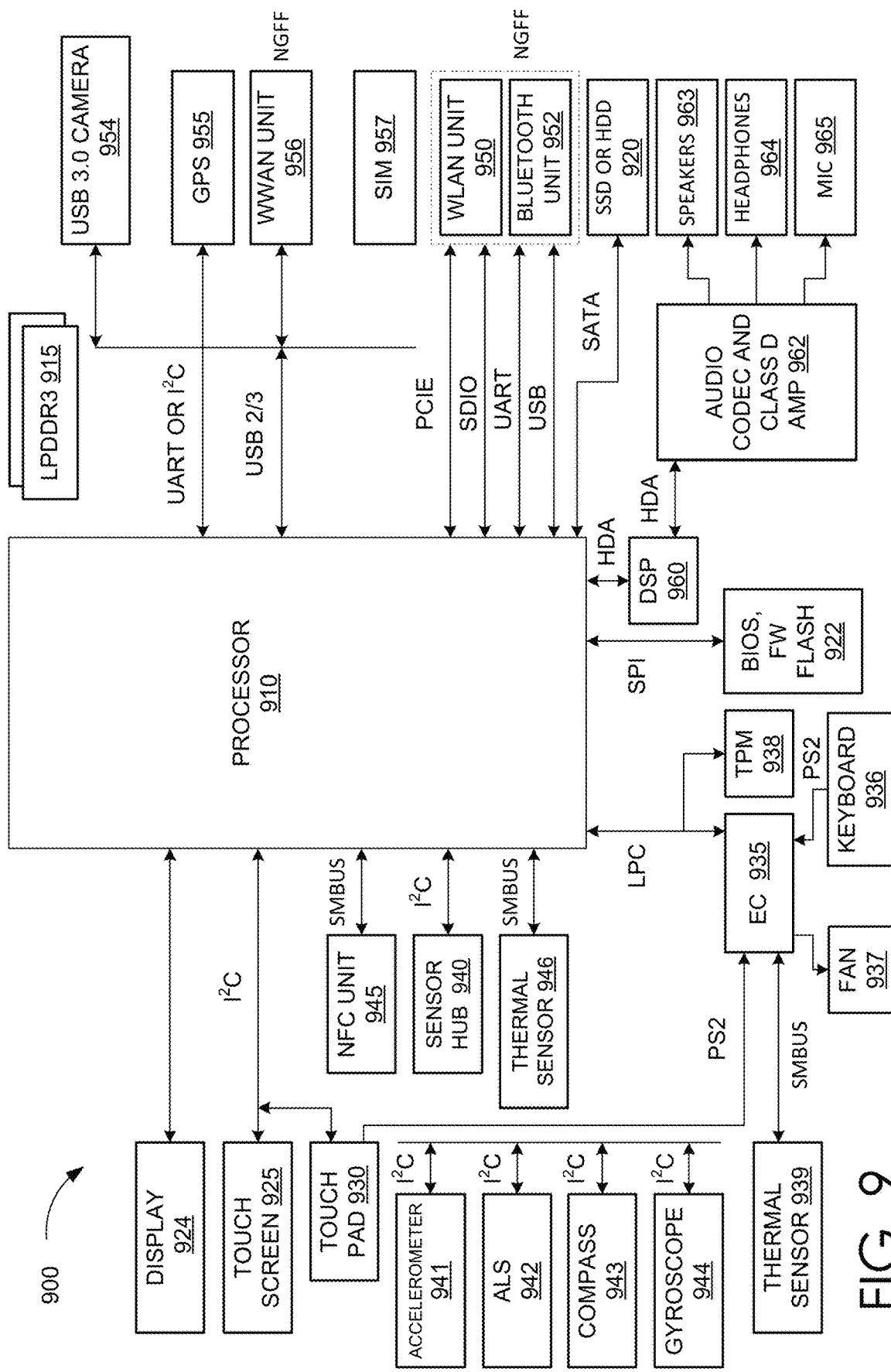
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used to update a hash map or other such construct. This can include aggregating updates from single threads into a single thread of execution for individual entries of the hash map.

Figure 10:
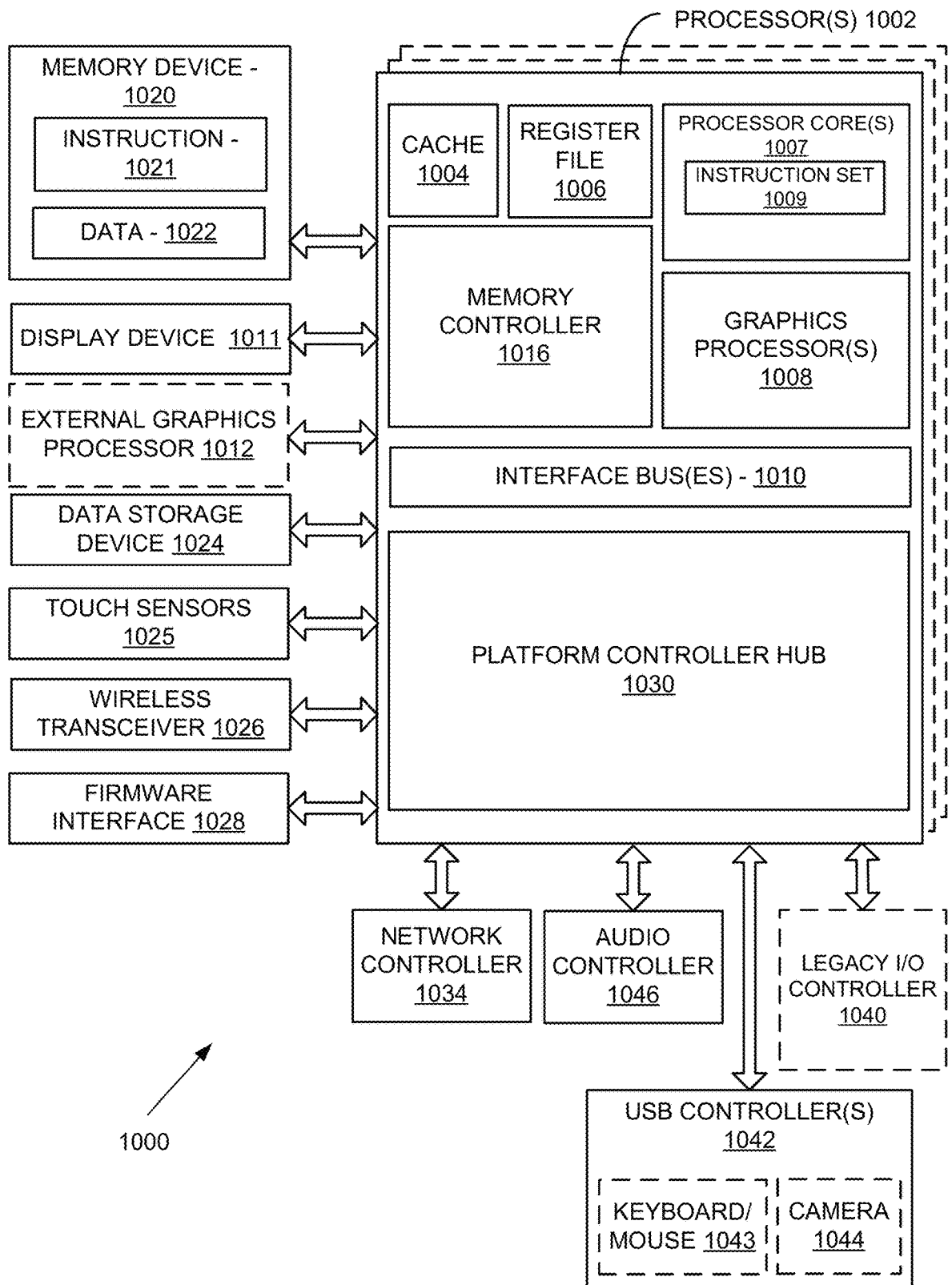
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system having a large number of processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment, processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used to update a hash map or other such construct. This can include aggregating updates from single threads into a single thread of execution for individual entries of the hash map.

Figure 11:
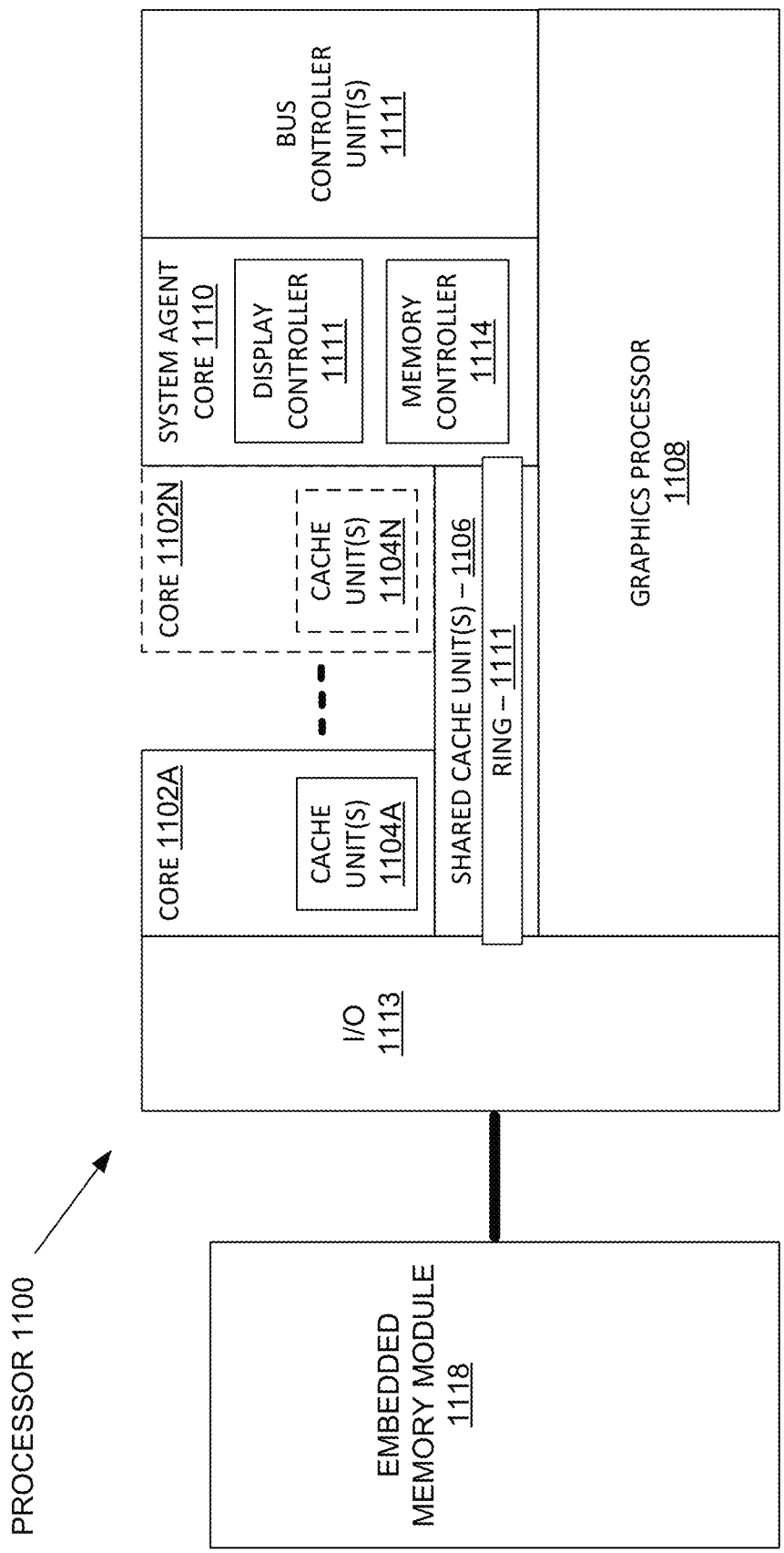
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used to update a hash map or other such construct. This can include aggregating updates from single threads into a single thread of execution for individual entries of the hash map.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   receiving a set of change requests for data in a dataset, the change requests received over a set of parallel threads of execution;
   storing information for the change requests to a buffer, the information including indices of the change requests and one or more values representing at least one other attempt at modifying individual entries in a hash map corresponding to the change requests; and
   iterating through one or more of the change requests for the individual entries in the hash map using single threads of execution to update the hash map.

2. The computer-implemented method of claim 1, wherein the hash map includes a set of keys and hash map entries corresponding to pixels of an image or video frame data.

3. The computer-implemented method of claim 1, further comprising:
   initiating a generation pass by an animation application to generate a next frame of image or video data.

4. The computer-implemented method of claim 3, wherein the set of change requests correspond to individual pixels for generating the next frame of image or video data.

5. The computer-implemented method of claim 4, further comprising:
   generating a list of a plurality of change requests for individual entries in the hash map, wherein the list contains indices of all corresponding elements in the buffer.

6. The computer-implemented method of claim 1, wherein the dataset represents world-space data.

7. The computer-implemented method of claim 6, further comprising:
   determining the set of change requests based at least in part on simulating light transport for a specified point of view of a virtual camera.

8. The computer-implemented method of claim 6, wherein individual entries in the hash map correspond to cells comprised of the world-space data visible through one or more pixel locations.

9. The computer-implemented method of claim 1, where the dataset is generated using multiple parallel threads for at least one application of a group of applications comprising:

an application implemented using a control system for an autonomous or semi- autonomous machine;
an application implemented using a perception system for an autonomous or semi-autonomous machine;
an application for performing simulation operations;
an application for performing digital twin operations;
an application for performing light transport simulation;
an application for performing collaborative content creation for 3D assets;
an application for performing deep learning operations;
an application implemented using an edge device;
an application for generating or presenting at least one of virtual reality content, augmented reality content, or mixed reality content;
an application implemented using a robot;
an application for performing conversational AI operations;
an application for generating synthetic data;
an application incorporating one or more virtual machines (VMs);
an application implemented at least partially in a data center; or
an application implemented at least partially using cloud computing resources.

10. The computer-implemented method of claim 1, wherein one or more of the individual entries each contain at least one unsigned integer checksum value and at least one unsigned integer representing the one or more values, and the updating the one or more values is based on the indices stored in the buffer.

11. A processor, comprising:
one or more circuits to:
receive a set of change requests for data in a dataset, the change requests received over a set of parallel threads of execution;
store information for the change requests to a buffer, the information including indices of the change requests and one or more values representing at least one other attempt at modifying individual entries in a hash map corresponding to the change requests; and
iterate through one or more of the change requests for the individual entries in the hash map using single threads of execution to update the hash map.

12. The processor of claim 11, wherein the hash map represents dataset world-space data, and wherein one or more individual entries in the hash map correspond to cells comprised of the world-space data visible through one or more pixel locations.

13. The processor of claim 12, wherein the one or more circuits are further to:
initiate a generation pass by an animation application to generate a next frame of image or video data, wherein the set of change requests correspond to individual pixels for generating the next frame of image or video data.

14. The processor of claim 11, wherein the one or more circuits are further to:
determine the set of change requests based at least in part on simulating light transport for a specified point of view of a virtual camera.

15. The processor of claim 11, wherein the individual entries contain at least one unsigned integer checksum value and at least one unsigned integer representing the one or more values and updating the one or more values based on the indices stored in the buffer.

16. A system, comprising:
one or more processors to iterate through change requests, received over a set of parallel threads of execution, for individual entries in a hash map using single threads of execution to update the hash map based at least in part on one or more values representing at least one attempt at modifying individual entries in the hash map corresponding to the change requests.

17. The system of claim 16, wherein the information is stored to a buffer and includes indices of the change requests.

18. The system of claim 16, wherein individual entries in the hash map correspond to cells comprised of world-space data visible through one or more pixel locations.

19. The system of claim 16, wherein the one or more processors are further to:
initiate a generation pass by an animation application to generate a next frame of image or video data, wherein the set of change requests correspond to individual pixels for generating the next frame of image or video data.

20. The system of claim 16, wherein the one or more processors are further to:
determine the set of change requests based at least in part on simulating light transport for a specified point of view of a virtual camera.

* * * * *